United States Patent

Finder

[15] 3,668,132

[45] June 6, 1972

[54] COMPOSITION AND METHOD

[72] Inventor: Earl E. Finder, Cottage Grove, Minn.

[73] Assignee: Ecodyne Corporation, Chicago, Ill.

[22] Filed: June 15, 1970

[21] Appl. No.: 46,551

[52] U.S. Cl. .................................... 252/80, 21/2.7, 134/2, 252/175, 252/387
[51] Int. Cl. ........................................................ C02b 5/04
[58] Field of Search .................... 252/80, 175, 180, 181, 387; 134/2; 21/2.7

[56] References Cited

UNITED STATES PATENTS

| | | | |
|---|---|---|---|
| 2,299,748 | 10/1942 | Hatch | 252/175 |
| 1,997,256 | 4/1935 | Hall | 21/2.7 |
| 2,358,222 | 9/1944 | Fink et al. | 252/175 |
| 2,244,158 | 6/1941 | Hubbard | 252/175 |
| 2,370,473 | 2/1945 | King | 210/23 |
| 2,658,036 | 11/1953 | Core et al. | 252/80 |
| 3,085,975 | 4/1963 | Jennings | 252/181 |

*Primary Examiner*—John T. Goolkasian
*Assistant Examiner*—D. J. Fritsch
*Attorney*—Roy E. Hofer, David A. Anderson and Charles M. Kaplan

[57] ABSTRACT

An improved water treating composition comprising about 45 to 85 percent alkali metal hexametaphosphate, about 5 to 35 percent alkali metal pyrophosphate, and about 3 to 30 percent di-alkali metal orthophosphate. The preferred composition is a 70-20-10 composition, containing 70 percent sodium hexametaphosphate, about 20 percent sodium hydrogen pyrophosphate, and about 10 percent dipotassium orthophosphate. The invention also provides a method for treating water which comprises adding the foregoing compositions to water at levels of about 0.5 to 20 ppm.

8 Claims, No Drawings

COMPOSITION AND METHOD

The present invention relates to an improved composition for the treatment of water.

In many areas, the presence of dissolved metals, particularly iron and calcium, in the water supply causes severe problems. For example, the presence of iron in water can cause certain beverages such as tea, coffee, and certain alcoholic drinks to turn black and have a bitter taste, resulting from a reaction with the tannic acid that forms a component of these beverages. When iron-containing water and chlorine bleach are brought together for bleaching clothes, red, rusty water stains are sometimes produced. At the same time, many waters are highly corrosive, and will corrode metals rapidly, leading to the corrosion of pipes, tanks and the like. Furthermore, water containing iron and/or its oxides often has an unattractive, dark color. Large quantities of calcium can also cause scaling of tanks and plumbing.

While ion exchange-type water softeners are effective in partially overcoming the aforementioned problems, the use of a water softener is expensive, and requires periodic (often frequent) regeneration of the ion exchange resin. Furthermore, in many applications, it is not necessary to soften the water, so long as the aforementioned deleterious effects can be overcome.

Generally, the present invention relates to an improved water treatment composition which comprises about 45 to 85 percent of an alkali metal hexametaphosphate, about 5 to 35 percent of an alkali metal hydrogen pyrophosphate, and about 3 to 30 percent of a di-alkali metal orthophosphate.

The present invention also provides a method for treating water, which comprises incorporating into the water from about 0.5 to about 20 parts per million of water treating composition having the components indicated above.

More specifically, it has now been found that the characteristics of water, particularly water containing dissolved iron, can be vastly improved by dissolving therein a composition which comprises a combination of an alkali metal hexametaphosphate (preferably sodium hexametaphosphate), an alkali metal hydrogen pyrophosphate (preferably sodium hydrogen pyrophosphate), and a di-alkali metal orthophosphate, preferably dipotassium orthophosphate. It has been found that combinations of these three components in the proportions mentioned produce outstanding results in the areas of iron corrosion resistance, color stability, chelating, and rust (iron oxide) dissolution. Optimum results are produced with compositions comprising about 70 percent alkali metal hexametaphosphate together with about 20 percent alkali metal hydrogen pyrophosphate and about 10 percent di-alkali metal orthophosphate. Such a composition, when added to water, greatly enhances the ability of the water to dissolve rust, when producing virtually no detectable color from dissolved iron, effectively inhibiting corrosion, and performing well as a chelating agent.

The presence of an orthophosphate also makes it much easier to detect and measure the amount of water treatment composition in the water. That is, while it is difficult to measure polyphosphates, orthophosphates can easily be determined, for example, by the aminophthalsulfonic acid method set forth in the Standard Methods for Examination of Water and Waste Water (12th ed.).

The components of the composition may simply be physically mixed in a powder form, or may be prepared as a concentrated aqueous solution. Conveniently, the material may be shipped in solid form to the retail seller or commercial user, who then prepares an aqueous solution for ease in dispensation.

The following examples are intended to illustrate the invention, and should not be construed as limitative, the scope of the invention being determined by the appended claims.

EXAMPLE I

In order to determine color stability, samples were prepared having 1 gram of iron filings in 300 milliliters of distilled water. Various water treatment compositions were added to each sample at a concentration of 1 percent. This concentration is far in excess of the concentrations employed in actual use, and the test represents conditions that are also more severe than those actually contemplated. However, the test is a meaningful indication of the results to be expected in actual use. The samples were allowed to stand at 20° C. for 24 hours, with stirring at 4, 19, and 23 hours. After 24 hours had elapsed, a sample was removed from each solution and the light transmittance was measured at 410 millimicrons on a Coleman Universal Spectrophotometer using a 13 millimeter cell. The results are shown in table I, below.

TABLE I

| Composition | | | % Transmittance |
|---|---|---|---|
| % Sodium Hexametaphosphate | % Sodium Pyrophosphate | % Dipotassium Orthophosphate | |
| 70 | 27 | 3 | 92.7 |
| 70 | 25 | 5 | 93.3 |
| 70 | 23 | 7 | 93.0 |
| 70 | 20 | 10 | 93.0 |
| 70 | 15 | 15 | 91.5 |
| 70 | 12 | 18 | 89.9 |
| 70 | 10 | 20 | 90.0 |
| 70 | 3 | 27 | 89.3 |
| 45 | 25 | 30 | 92.9 |
| 45 | 30 | 25 | 93.0 |
| 45 | 35 | 20 | 93.2 |
| 45 | 40 | 15 | 94.5 |
| 45 | 45 | 10 | 93.5 |
| 85 | 5 | 10 | 85.2 |
| 85 | 7 | 8 | 88.2 |
| 85 | 10 | 5 | 85.7 |
| 100 | 0 | 0 | 71.5 |
| 0 | 100 | 0 | 98.0 |
| 0 | 0 | 100 | 96.5 |
| Blank (distilled water) | | | 48.5 |

It was visually determined that the color became objectionable when the percent transmittance fell below about 85 percent. It is thus seen that all of the samples employing a combination of the three components produced acceptable color, while the blank had an extremely poor color, and the sample containing 100 percent sodium hexametaphosphate also had an objectionable color level. As can also be seen from the foregoing results, the color was barely acceptable in the samples containing 85 percent sodium hexametaphosphate. Those samples containing a smaller percentage of this component produce much more desirable color levels. In fact, while samples having a percent transmittance in the neighborhood of about 85 percent were judged not objectionable, samples having a transmittance of 93 percent or more were definitely preferred.

EXAMPLE II

A second sample of the water that had been in contact with the iron filings in example I was measured for iron content in order to determine the amount of corrosion resistance produced by the various compositions. The iron determination was made according to the 1,10-phenathrolene method in the Standard Methods for Examination of Water and Waste Water (12th Ed.). The higher values indicate higher levels of corrosion. The results are shown below in table II.

TABLE II

| Composition | | | PPM Iron |
|---|---|---|---|
| % Sodium Hexametaphosphate | % Sodium Pyro- | % Dipotassium Orthophosphate | |

| | phosphate | | |
|---|---|---|---|
| 70 | 27 | 3 | 205 |
| 70 | 25 | 5 | 220 |
| 70 | 23 | 7 | ½ |
| 70 | 20 | 10 | 170 |
| 70 | 15 | 15 | 200 |
| 70 | 12 | 18 | 185 |
| 70 | 10 | 20 | 160 |
| 70 | 5 | 25 | 105 |
| 70 | 3 | 27 | 85 |
| 45 | 25 | 30 | 180 |
| 45 | 30 | 25 | 185 |
| 45 | 35 | 20 | 200 |
| 45 | 40 | 15 | 220 |
| 45 | 45 | 10 | 200 |
| 85 | 5 | 10 | 205 |
| 85 | 7 | 8 | 205 |
| 85 | 10 | 5 | 220 |
| 100 | 0 | 0 | 110 |
| 0 | 100 | 0 | 275 |
| 0 | 0 | 100 | 0 |
| Blank | — | — | 260 |

As can be seen from the preceding table, a mixture of 70 percent sodium hexametaphosphate, 20 percent sodium acid pyrophosphate, and 10 percent dipotassium phosphate produces outstanding corrosion resistance. It can also be seen from the values given for formulations containing 70 percent sodium hexametaphosphate that the iron corrosion goes through a minimum of 170 ppm. for the 70-20-10 composition. While lower values were produced by other compositions, all of these compositions suffered from other disadvantages rendering them less acceptable. For example, the 70-3-27 composition in the foregoing table produced only 85 ppm. dissolved iron. However, this composition had a very poor ability to dissolve iron oxide, as shown in the following example. Similarly, the sample containing 100 percent sodium hexametaphosphate produced excellent results in this test, but had very poor color stability, as shown by the preceding example.

EXAMPLE III

In this example, the samples were prepared by placing 1 gram of iron oxide powder ($Fe_2O_3$) in 300 ml. of a 1 percent solution of each formulation to be tested. After the solutions had stood for 24 hours, a 50 ml. aliquot was taken from each sample, and 5 ml. $Al_2(OH)_3$ was added to insure clear filtration. The samples were then filtered through a Whatman No. 40 filter paper and diluted to 100 ml. The concentration of iron was determined in accordance with the 1,10-phenanthrolene method discussed in example II. The results are shown on table III below.

TABLE III

| | Composition | | % Fe |
|---|---|---|---|
| % Sodium Hexametaphosphate | % Sodium Hydrogen Pyrophosphate | % Dipotassium Orthophosphate | |
| 70 | 25 | 5 | 1.2 |
| 70 | 23 | 7 | 1.6 |
| 70 | 20 | 10 | 2.0 |
| 70 | 15 | 15 | 0.6 |
| 70 | 12 | 18 | 0.6 |
| 75 | 25 | 0 | 0.8 |
| 70 | 0 | 30 | 0.4 |
| 80 | 0 | 20 | 0.3 |
| 90 | 0 | 10 | 0.8 |
| 95 | 0 | 5 | 1.1 |
| 0 | 35 | 65 | 0.7 |
| 0 | 25 | 75 | 0.2 |
| 0 | 15 | 85 | 0.3 |

As can be seen from the foregoing table, when the sodium hexametaphosphate is held constant at 70 percent, while the other two components are varied, the percentage of dissolved iron oxide goes through a maximum at 20 percent sodium acid pyrophosphate and 10 percent dipotassium phosphate. Furthermore, no two-component system was able to equal this performance. Thus, for maximum rust dissolution the 70-20-10 mixture is clearly preferred.

EXAMPLE IV

Various samples of water treating composition were tested for chelating ability according to the following procedure. 1 to 2 grams of the water treating composition was weighed out and diluted to 85 ml. with distilled water. The pH was adjusted to 11-12 with a 50 percent solution of sodium hydroxide. 2 to 4 drops of a 2 percent aqueous sodium oxalate solution were added, and the solution was titrated with 4.41 percent calcium acetate in a dark room with a beam of light passing through the solution. The solution was titrated rapidly at first, and more slowly as the end point was approached. The solution was stirred on a magnetic stir plate, and the end point was reached when there was persistent turbidity.

The chelating ability of the sample was determined according to the following calculation:

$$\frac{2(\text{ml. calcium acetate})}{\text{weight of sample}} = \text{mg. calcium carbonate chelated per gram of sample.}$$

The results are shown in table IV below.

TABLE IV

| Composition | | | |
|---|---|---|---|
| Wt. % Sodium Hexametaphosphate | wt. % Sodium Hydrogen Pyrophosphate | Wt. % Dipotassium Orthophosphate | Mg $CaCO_3$ Chelated |
| 100 | 0 | 0 | 1200 |
| 80 | 0 | 20 | 1000 |
| 40 | 0 | 60 | 350 |
| 0 | 0 | 100 | 0 |
| 60 | 40 | 0 | 805 |
| 0 | 100 | 0 | 800 |
| 70 | 20 | 10 | 1000 |
| 60 | 27 | 13 | 900 |
| 0 | 67 | 33 | 500 |
| 45 | 5 | 50 | 400 |
| 75 | 20 | 5 | 830 |
| 60 | 20 | 20 | 800 |
| 45 | 20 | 35 | 540 |
| 30 | 20 | 50 | 520 |
| 60 | 35 | 5 | 1000 |
| 50 | 25 | 25 | 710 |

The foregoing table shows that the dipotassium orthophosphate alone has no chelating ability whatever. Furthermore, compositions having in excess of about 35 percent orthophosphate had very poor chelating ability. It can be seen that the 70-20-10 sample, preferred for iron oxides dissolution, has a chelating ability that is nearly equal to the sodium hexametaphosphate taken alone.

EXAMPLE V

The foregoing examples were carried out under laboratory conditions, wherein the tests were far more severe than any difficulties actually encountered in use. Furthermore, the amount of water treating composition employed was far in excess of the amount employed in the field. Therefore, the following test was conducted with the preferred composition under actual field conditions.

A hospital utilized a raw water supply having a total iron content of about 2 ppm. As a result of this high iron content, there was a large accumulation of iron oxide scale in the piping system, porcelain fixtures were stained, and valves, particularly toilet flush valves frequently became clogged and stuck.

A composition containing 70 percent sodium hexametaphosphate, 20 percent sodium hydrogen pyrophophate, and 10 percent dipotassium orthophosphate was metered into the water. In order to prevent excessive initial dissolution of iron oxide which had collected in the system, the water treating composition was initially added at a very low level, and was gradually increased over a period of 90 days until the composition was added at a level of 4 ppm.

The iron level in the treated water initially jumped to 6 ppm., indicating that scale was being removed from the plumbing system. However, the water was clear, and did not cause any staining. After 80 days had elapsed, the iron level in the treated water had dropped to 2 ppm., the same level as that in the raw water. This drop shows that scale was not being further removed from the plumbing system. It was found that staining of porcelain fixtures was eliminated, and maintenance costs on valves and plumbing were reduced by about 90 percent.

As can be seen from the foregoing examples, it is important to maintain the components of the water treating composition within certain ranges if optimum results are to be obtained. Specifically, if the alkali metal hexametaphosphate is greater than about 85 percent, the color becomes unacceptable, while below about 45 percent, chelating ability was poor. Alkali metal hydrogen pyrophosphate levels above about 35 percent produced solubility problems in preparing concentrated solutions. However, a small amount (at least about 5 percent) was required for color stability and iron oxide dissolution. Finally, about 3 to 35 percent di-alkali metal orthophosphate is needed for color stability and iron oxide dissolution.

It will, of course, be understood that the foregoing percentages, and those set forth in the claims are by weight, and are the percentages of the components without consideration of other unspecified components that may be added to the composition. For example, a composition containing 50 percent of an unspecified component together with 35 percent alkali metal hexametaphosphate, and 5 percent di-alkali metal orthophosphate would fall within the scope of the invention, since this is actually a 70-20-10 mixture combined with another component.

Obviously, many modifications and variations of the invention as hereinbefore set forth will occur to those skilled in the art, and it is intended to cover in the appended claims all such modifications and variations as fall within the true spirit and scope of the invention.

I claim:

1. A water treating composition comprising about 45 to 85 percent of an alkali metal hexametaphosphate; about 5 to 35 percent of an alkali metal hydrogen pyrophosphate; and about 3 to 30 percent of a di-alkali metal orthophosphate.

2. The composition was defined in claim 1 wherein said alkali metal hexametaphosphate is sodium hexametaphosphate, said alkali metal hydrogen pyrophosphate is sodium hydrogen pyrophosphate, and said di-alkali metal orthophosphate is dipotassium orthophosphate.

3. The composition as defined in claim 1 wherein said composition comprises about 70 percent of said alkali metal hexametaphosphate, about 20 percent of said alkali metal hydrogen pyrophosphate, and about 10 percent of said di-alkali metal orthophosphate.

4. A water treating composition comprising: about 70 percent sodium hexametaphosphate; about 20 percent sodium hydrogen pyrophosphate; and about 10 percent dipotassium orthophosphate.

5. A method for treating water comprising: adding to said water from 0.5 to about 20 parts per million of a composition comprising about 45 to 85 percent of an alkali metal hexametaphosphate; about 5 to 35 percent of an alkali metal hydrogen pyrophosphate; and about 3 to 30 percent of a di-alkali metal orthophosphate.

6. The method as defined in claim 5 wherein said alkali metal hexametaphosphate is sodium hexametaphosphate, said alkali metal hydrogen pyrophosphate is sodium hydrogen pyrophosphate, and said di-alkali metal orthophosphate is dipotassium orthophosphate.

7. The method as defined in claim 5 wherein said composition comprises about 70 percent of said alkali metal hexametaphosphate, about 20 percent of said alkali metal hydrogen pyrophosphate, and about 10 percent of said di-alkali metal orthophosphate.

8. A method for treating water comprising: adding to said water a composition comprising about 70 percent sodium hexametaphosphate, about 20 percent sodium hydrogen pyrophosphate and about 10 percent dipotassium orthophosphate.

* * * * *

UNITED STATES PATENT OFFICE
CERTIFICATE OF CORRECTION

Patent No. 3,668,132     Dated June 6, 1972

Inventor(s) Earl E. Finder

It is certified that error appears in the above-identified patent and that said Letters Patent are hereby corrected as shown below:

Table II, column 3, fourth column of the table, "1/2" should be "180".

Table III, column 3, under % Fe, 1.2 should be above 1.6.

Signed and sealed this 27th day of February 1973.

(SEAL)
Attest:

EDWARD M. FLETCHER, JR.
Attesting Officer

ROBERT GOTTSCHALK
Commissioner of Patents